(12) United States Patent  (10) Patent No.: US 7,925,037 B2
Te Riet  (45) Date of Patent: Apr. 12, 2011

(54) COMMUNICATIONS HEADSET

(75) Inventor: Johan Te Riet, Hengelo (NL)

(73) Assignee: Sony Ericsson Mobile Communications AB, Lund (SE)

( * ) Notice: Subject to any disclaimer, the term of this patent is extended or adjusted under 35 U.S.C. 154(b) by 1190 days.

(21) Appl. No.: 11/254,006

(22) Filed: Oct. 19, 2005

(65) Prior Publication Data

US 2007/0099673 A1 May 3, 2007

(51) Int. Cl.
*H04R 25/00* (2006.01)
(52) U.S. Cl. .................. 381/381; 381/330; 381/379
(58) Field of Classification Search .................. 381/381,
381/330, 331, 374, 376, 379; 379/430, 433.13,
379/420.04; 455/575.2, 575.6; 181/129
See application file for complete search history.

(56) References Cited

U.S. PATENT DOCUMENTS

| | | | | |
|---|---|---|---|---|
| 2,474,135 | A * | 6/1949 | White | 381/381 |
| 4,453,050 | A * | 6/1984 | Enokido | 381/381 |
| 6,584,208 | B2 * | 6/2003 | Cheng | 381/381 |
| 6,707,923 | B2 * | 3/2004 | Pronk | 381/374 |
| 6,914,997 | B2 * | 7/2005 | MacDonald et al. | 381/381 |
| 7,046,799 | B2 * | 5/2006 | Ma | 379/433.13 |
| 7,130,419 | B2 * | 10/2006 | Bodley et al. | 379/430 |
| 7,133,708 | B2 * | 11/2006 | Park et al. | 455/575.2 |
| 7,221,771 | B1 * | 5/2007 | DeKalb et al. | 381/381 |
| 7,346,180 | B2 * | 3/2008 | Ham | 381/381 |
| 7,539,525 | B2 * | 5/2009 | Kim | 455/575.2 |
| 7,580,541 | B2 * | 8/2009 | Hlas et al. | 381/381 |
| 7,613,292 | B2 * | 11/2009 | te Riet | 379/430 |
| 7,778,410 | B2 * | 8/2010 | Liu et al. | 379/430 |
| 2002/0106100 | A1 * | 8/2002 | Kao | 381/381 |
| 2003/0002704 | A1 | 1/2003 | Pronk | |
| 2003/0235321 | A1 * | 12/2003 | Lu | 381/381 |
| 2004/0190745 | A1 * | 9/2004 | Chen | 381/381 |
| 2005/0058280 | A1 | 3/2005 | Ma | |
| 2007/0003095 | A1 * | 1/2007 | Slamka et al. | 381/381 |
| 2007/0286409 | A1 * | 12/2007 | Liu et al. | 379/430 |
| 2008/0188179 | A1 * | 8/2008 | Liu et al. | 455/41.2 |

FOREIGN PATENT DOCUMENTS

EP  1 372 353 A1  12/2003

OTHER PUBLICATIONS

"Left right change for a headset", Research Disclosure, Mason Publications, Hampshire, GB, 448:089, p. 1361 (Aug. 2001). XP001128210; ISSN: 0374-4353.

* cited by examiner

*Primary Examiner* — Curtis Kuntz
*Assistant Examiner* — Ryan Robinson
(74) *Attorney, Agent, or Firm* — Myers Bigel Sibley & Sajovec

(57) ABSTRACT

A communications headset may be worn on an ear of a user. The headset may include a housing provided with a protruding concha-engaging part and a hook. The hook has an ear-engaging part and a joint part. The joint part is connected to the housing in that it is retained by a lug which is provided on an upper surface of a bottom wall of the housing. The joint part has an end portion which is configured as a rotation axis around which the hook is rotatable.

14 Claims, 3 Drawing Sheets

COMMUNICATIONS HEADSET

FIELD OF THE INVENTION

The invention relates to communications headsets worn on an ear of a user.

BACKGROUND

An example of a known communications headset is illustrated in EP 1 372 353 A1, which proposes a headset to be worn on an ear of a user, including a housing provided with a speaker and a microphone, and a hook connected to the housing through a joint, which is configured to be positioned above and behind the ear of a user when the headset is worn by the user. The headset is configured with rotation means that allows the hook to be rotated about an axis between a position in which it is located close to the housing and a position in which it protrudes from the housing. The joint is provided as a releasable snap-coupling including an at least partly ball-shaped socket protruding from the housing and a complementary ring-shaped rubber part securely fixed in a ring element of the hook. By providing the hook with a ring-shaped rubber part, a snap coupling is enabled between the socket at the housing and the hook since the ring-shaped rubber part allows the socket to be forced into the ring-shaped rubber part by elastic deformation thereof. Moreover, by providing the concha-engaging part, the headset may fit almost any person irrespective of the shape of the ear, and it may be readily be put on with one hand and without the need for detailed adjustment.

The headset described above provides for easy handling on either side of the head, i. e. on either one of the two ears of a user. However, this headset is relatively complicated in its design, and, thus, may be expensive in production.

SUMMARY OF THE INVENTION

According to some embodiments of the invention, a hook is rotatably connected to the housing, wherein the joint part of the hook has an end portion which is configured as a rotation axis around which the hook is rotatable. The joint part of the hook of the communications headset may include an end portion that is substantially U-shaped.

In some embodiments, the end portion of the joint part may be flexible. The rotation axis provided on the end portion can be non-continuous, such that a gap is formed substantially in the middle part of the axis. Thus, an easy left-right change or replacement of the hook, respectively, from the headset may be achieved by snapping the hook off the hook-engaging part, and replacing it upside down in the hook-engaging part by snapping it on again.

According to some embodiments, the rotation axis is kept connected to the housing, wherein it is accommodated in between a wire spring provided in a corresponding recess in a bottom wall of the housing and a hook-engaging part provided on the surface of the bottom wall of the housing. An expensive spring package may be avoided and replaced by a simple wire spring, and, moreover, an extra rubber piece in the rotating point may not be needed.

To keep the hook in engagement with the housing, in some embodiments, the hook-engaging part is a lug.

According to other embodiments, the hook is rotatable around an angle in a range from 0° to 180°, wherein there are defined flip positions of the hook at 45°, 90°, and 135°. These flip positions, in which the hook can be positioned before putting it on the ear of a user, allow for further facilitation of handling the hook when putting it on in that the headset may be readily be put on the ear of a user with one hand and may reduce the need for detailed adjustment.

The hook may be connected to the housing releasably in some embodiments. This allows for the left-right change and a replacement of the hook, so that the headset can be worn on both sides of a user's head, i.e. on the left ear of a user or on the right ear.

In some embodiments, the connection between the housing and the hook is provided as a snap-coupling. Moreover, a concha-engaging part may be provided on the housing and protruding therefrom and adapted to be positioned in the concha of the ear of a user when the headset is worn. The concha of the ear is generally very similar from person to person and by providing the headset with a concha-engaging part, the headset may fit almost any person irrespective of the shape of the ear.

The hook of the communications headset may be adapted to be worn on both the right and the left ear of a user. Moreover, the communications headset can be adapted for wireless communication with an electronic device which may be a mobile telephone. Alternatively, the headset according to embodiments of the invention may be provided with a wire connectable to an electronic device.

Figure 1:
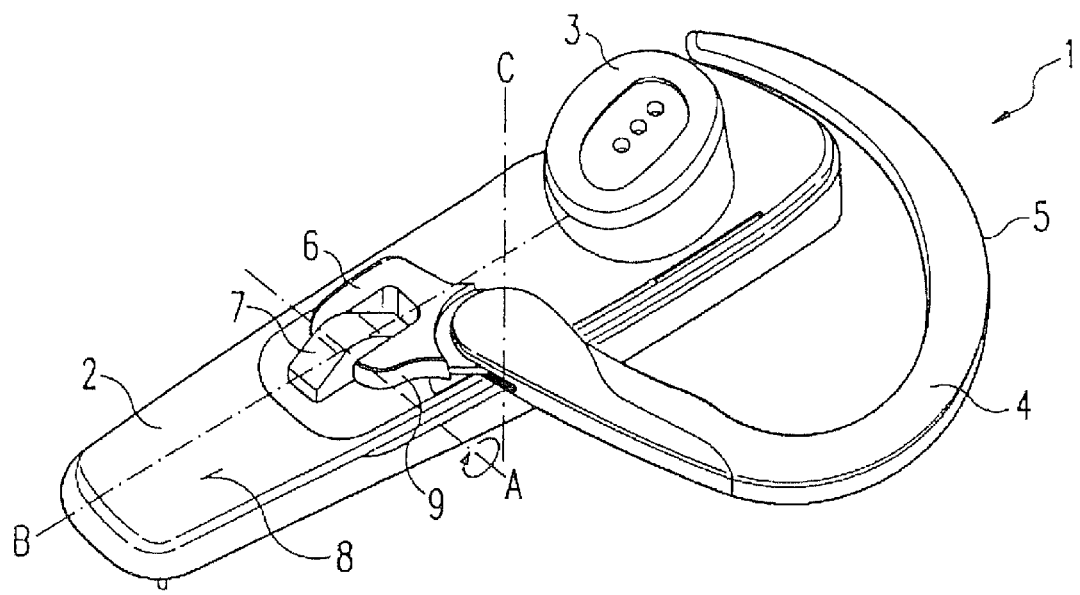
FIG. 1 is a perspective view of a communications headset according to embodiments the invention.

Further features, advantages and details of the present invention will be appreciated by those of ordinary skill in the art from a reading of the figures and the detailed description of the embodiments that follow, such description being merely illustrative of the present invention.

DETAILED DESCRIPTION OF EMBODIMENTS OF THE INVENTION

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a "first" element, component, region, layer or section discussed below could also be termed a "second" element, component, region, layer or section without departing from the teachings of the present invention. The sequence of operations (or steps) is not limited to the order presented in the claims or figures unless specifically indicated otherwise.

FIG. 1 illustrates a communications headset 1 according to embodiments of the invention. The headset 1 includes a housing 2 provided with a protruding concha-engaging part 3 and a hook 4. The hook 4 has an ear-engaging part 5 and a joint part 6. The joint part 6 is connected to the housing 2 in that it is retained by a hook-engaging part or lug 7, respectively, which is provided on an upper surface 8 of a wall of the housing 2. The joint part 6 has an end portion 9 which is configured as a rotation axis A around which the hook 4 is rotatable. The housing 2 of the communications headset 1 can include injection molded plastics shell parts that enclose electronic components provided within the housing 2. The protruding concha-engaging part 3 may be integrally molded with one of the plastics shell parts or it may be a separate element that is connected to the housing in any known manner. A speaker is provided in the concha-engaging part 3, and a microphone is provided in the housing 2 at the end thereof opposite to the concha-engaging part 3. These components and any other electronic components provided in the housing 2 may be of any conventional type and will not be described in detail in this application.

As illustrated, the concha-engaging part 3 is shaped as a short, cylindrical plug with a softly rounded and inclined top face adapted to abut on the concha of the user's ear. The diameter of the concha-engaging part 3 is chosen such that it may fit almost any person while still providing room for the speaker therein. The hook 4 has a curved configuration that allows it to be positioned above and behind the ear of a user.

Figure 2:
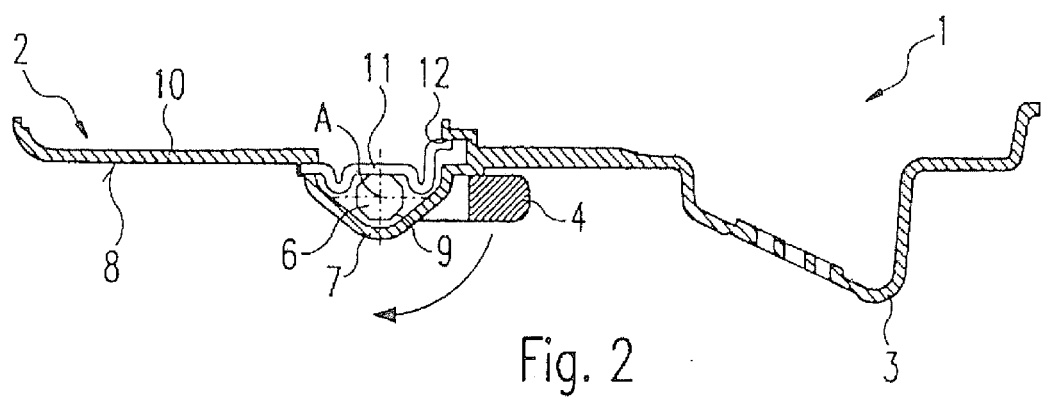
FIG. 2 is a cross section view of the communications headset of FIG. 1.

FIG. 2 shows a cross-section of the communications headset 1 shown in FIG. 1. A wall of the housing 2 has a bottom wall 10 with an upper surface 8. The end portion 9 is configured as the rotation axis A and, forming the hinge, is retained between the lug 9 connected to the upper surface 8 of the housing and a wire spring 11 provided in a corresponding recess 12 in the bottom wall 10 of the housing 1.

Figure 3A:
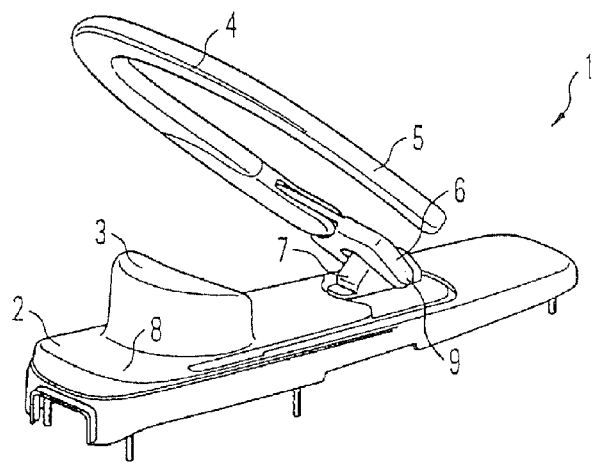
FIGS. 3A-C are different respective flipping positions of the hook of the communications headset according to embodiments of the invention.
Figure 3B:
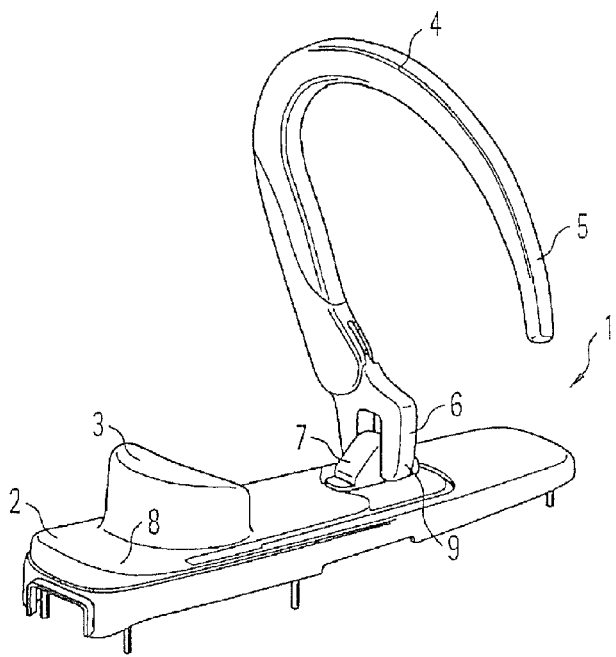
Figure 3C:
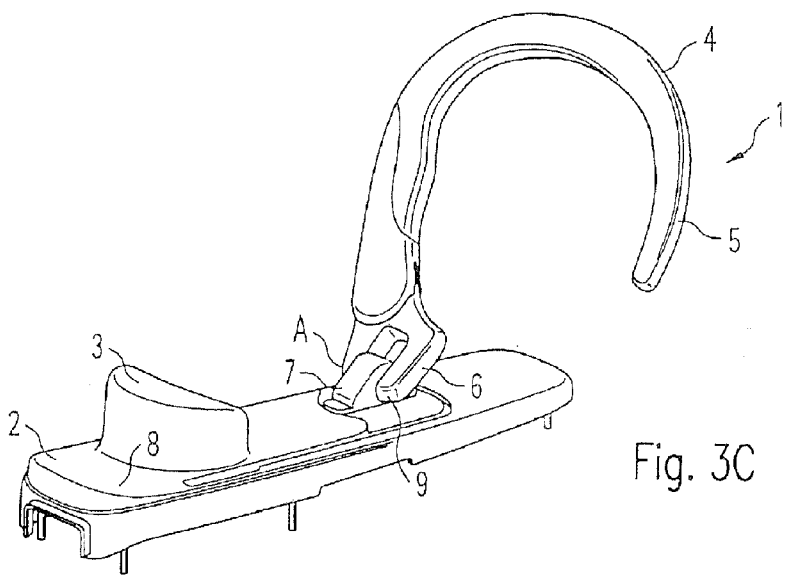

FIG. 3A to 3C respectively show flipping positions corresponding to different angles in a range from 0° to 180° around the rotation axis A. FIG. 3A shows a flipping position of the hook 4 corresponding to an angle of 45°, FIG. 3B shows a flipping position of the hook 4 corresponding to an angle of about 90° and finally, FIG. 3C shows a flipping position of the hook 4 corresponding to an angle of about 135°. When the hook is in the flipping position shown in FIG. 3B, the hook 4 can be positioned above and behind the ear of a user, as, e.g., shown in FIG. 5, wherein the concha-engaging part 3 engages the concha of the ear 13 of a user. For holding the hook 4 in these respective predetermined flipping positions, the rotation axis A or the end portion 9, respectively, could, for example, be provided as an indexing hinge (not shown) which is provided with spring means (not shown) that biases the ear-engaging part 5 of the hook 4 towards these predetermined positions. The indexing hinge may be of any conventional type and will not be discussed in further detail herein.

Figure 4A:
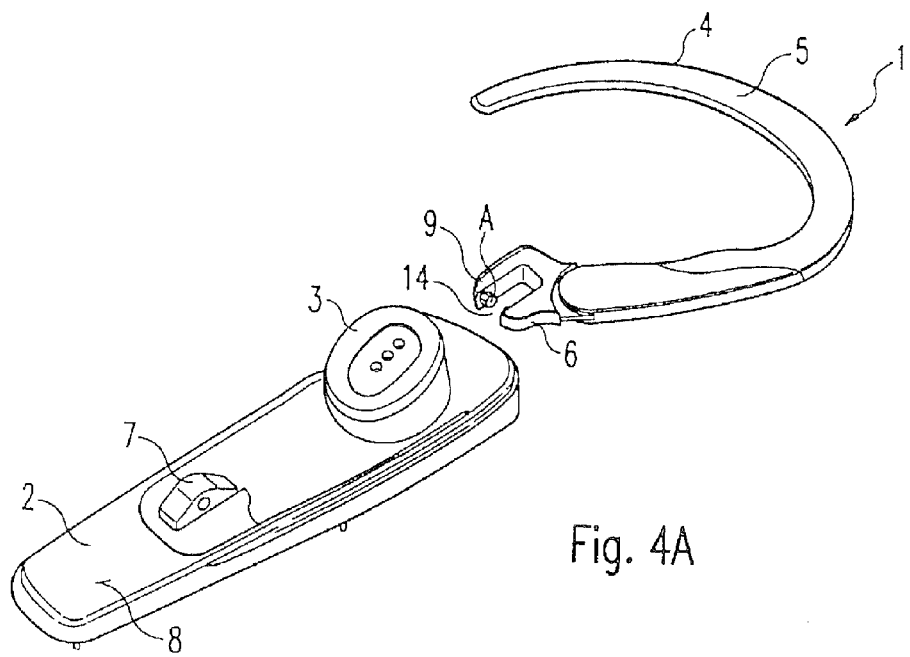
FIGS. 4A-B are perspective views of the headset of FIG. 1 illustrating a transformation of the headset from right-ear use to left-ear use according to embodiments of the invention.
Figure 4B:
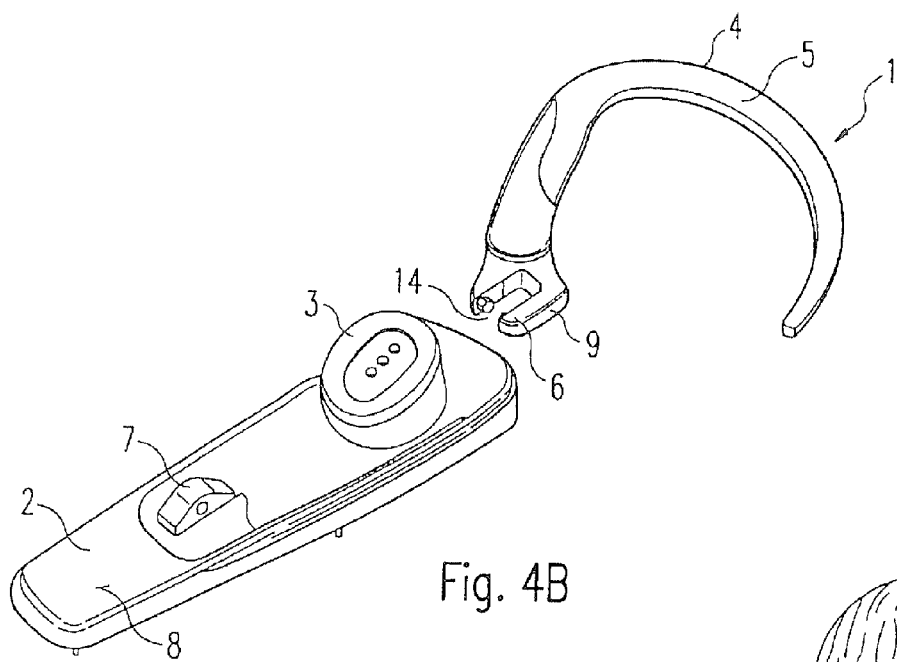

FIG. 4A and FIG. 4B display the transformation of the communications headset from a right-ear configuration to a left-ear configuration. The end portion 9 of the hook 4 substantially has a U-shape. Perpendicular to the two parallel portions of the U-shaped end-portion, the rotation axis A projects from each one of these portions. However, the rotation axis A is non-continuous such that a gap 14 is formed in between the two portions of the rotation axis A. Due to the material the hook is made from and due to the gap, the two parallel portions of the U-shaped end portion 9 of the hook can be slightly flexed outwards when a user pulls on the hook to replace it or to change it to another position. Thus, the end portion 9 can snap off and be disengaged from the lug 7 of the housing 2. The transformation may then be achieved by rotating the hook around 180° and snapping it back into the lug 7 in this position. Due to the symmetry of all the parts of the headset 1, the headset 1 can be put on, adjusted and worn in substantially the same manner, regardless whether it is used in the right-ear configuration or in the left-ear configuration.

Figure 5:
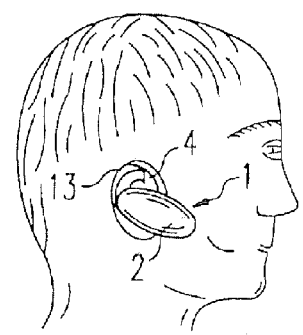
FIG. 5 illustrates a communications headset according to embodiments of the present invention worn by a user.

FIG. 5 illustrates the communications headset 1 as it is worn on the ear 13 of a user. The hook 4 has a curved configuration that allows it to be positioned above and behind the ear. The curved configuration of the hook 4 is fixed and can be provided with a curvature that is sufficiently large that it fits above and behind the ear 13 of almost any person. In the communications headset 1 according to embodiments of the invention, it is not important that the hook 4 has a curvature corresponding exactly to the helix of the ear because the headset 1 is not secured to the ear by the hook 4 alone, but via co-operation of the hook 4 and the concha-engaging part 3. Moreover, the ear-engaging part 5 and the joint part 6 of the hook can either be an integral part, or it is also possible to interconnect the two parts in such a manner that the two parts are mutually rotatable about another axis (not shown).

In the configuration of FIGS. 1-5, simplicity and effective construction may be achieved, in particular with respect to production costs. The hook 4 of the communication headset 1 according to embodiments of the invention may be adapted to solve several issues. For example, the headset 1 may be flipped open to allow the ear 13 of a user in between. The headset 1 may be rotated around an axis to facilitate a left-right ear-use change. However, according to the design of the hook 4 in that it flips on the bottom of the headset 1 and rotates on the hook 1 itself, a cost reduction can be achieved. The expensive spring package as provided in EP 1 372 353 A1 may be replaced by the wire spring 11, and the rotating point does not use an extra rubber piece.

The invention has been described with reference to the communications headset as shown in FIGS. 1-5. However, the headset may comprise other features than the ones shown. For example, the headset shown in FIGS. 1-5 is intended for wireless communication with an electronic telephone, but the principles of the invention may be used in a headset provided with a wire connected to the electronic communications device.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

The invention claimed is:

1. A communications headset to be worn on an ear of a user, the headset comprising:
    a housing;
    a hook having an ear-engaging part and a joint part connected to the housing; the hook being configured to be positioned above and behind an ear of a user when the headset is worn by the user;
    wherein the hook is rotatably connected to the housing, the joint part has an end portion which is configured as a first rotation axis around which the hook is rotatable so that the hook can be flipped open into a position in which the hook is configured to be positioned above and behind the ear of the user; and
    wherein the ear-engaging part and the joint part of the hook are mutually rotatable around a second rotation axis, wherein the second rotation axis is transverse to the first rotation axis,
    wherein the housing has a surface and a longitudinal axis, the communications headset further comprising:
    a concha-engaging part on the surface of the housing, the concha-engaging part being adapted to be positioned in a concha of the ear of a user when the headset is worn, the first rotation axis is parallel to the surface of the housing and transverse to the longitudinal axis of the housing, wherein when the hook is rotated about the first rotation axis, the second rotation axis remains transverse to the first rotation axis when an angle between the second rotation axis and the surface of the housing from which the concha-engaging part protrudes is changed.

2. A communications headset according to claim 1, wherein the end portion of the joint part substantially has a U-shape.

3. A communications headset according to claim 1, wherein the end portion of the joint part is flexible.

4. A communications headset according to claim 1, wherein the first rotation axis provided on the end portion is non-continuous, such that a gap is formed substantially in a middle portion of the first rotation axis.

5. A communications headset according to claim 1, wherein the first rotation axis is connected to the housing and is accommodated between a wire spring provided in a corresponding recess in a bottom wall of the housing and a hook-engaging part provided on a surface of the bottom wall of the housing.

6. A communications headset according to claim 5, wherein the hook-engaging part is formed as a lug.

7. A communications headset according to claim 1, wherein the hook is rotatable around an angle in a range from about 0° to 180°, wherein there are defined flip positions of the hook at 45°, 90°, and 135°.

8. A communications headset according to claim 1, wherein the hook is releasably connected to the housing.

9. A communications headset according to claim 1, wherein the connection between the housing and the hook is provided as a snap-coupling.

10. A communications headset according to claim 1, wherein the hook is adapted to be worn on both the right and the left ear of a user.

11. A communications headset according to claim 1, wherein the headset is adapted for wireless communication with an electronic device.

12. A communications headset according to claim 11, wherein the electronic device is a mobile telephone.

13. A communication headset according to claim 1, wherein the concha-engaging part protrudes from the surface of the housing in a direction, and wherein the first rotation axis is transverse to the direction in which the ear-engaging part protrudes from the surface of the housing.

14. A communication headset according to claim 1, wherein an angle between the second rotation axis and the longitudinal axis of the housing varies when the hook is rotated around the first rotation axis.

* * * * *